March 9, 1954  A. S. PAGE  2,671,670
REMOVABLE LOAD-CARRYING FRAME FOR TRUCKS
Filed Jan. 16, 1951  5 Sheets-Sheet 1
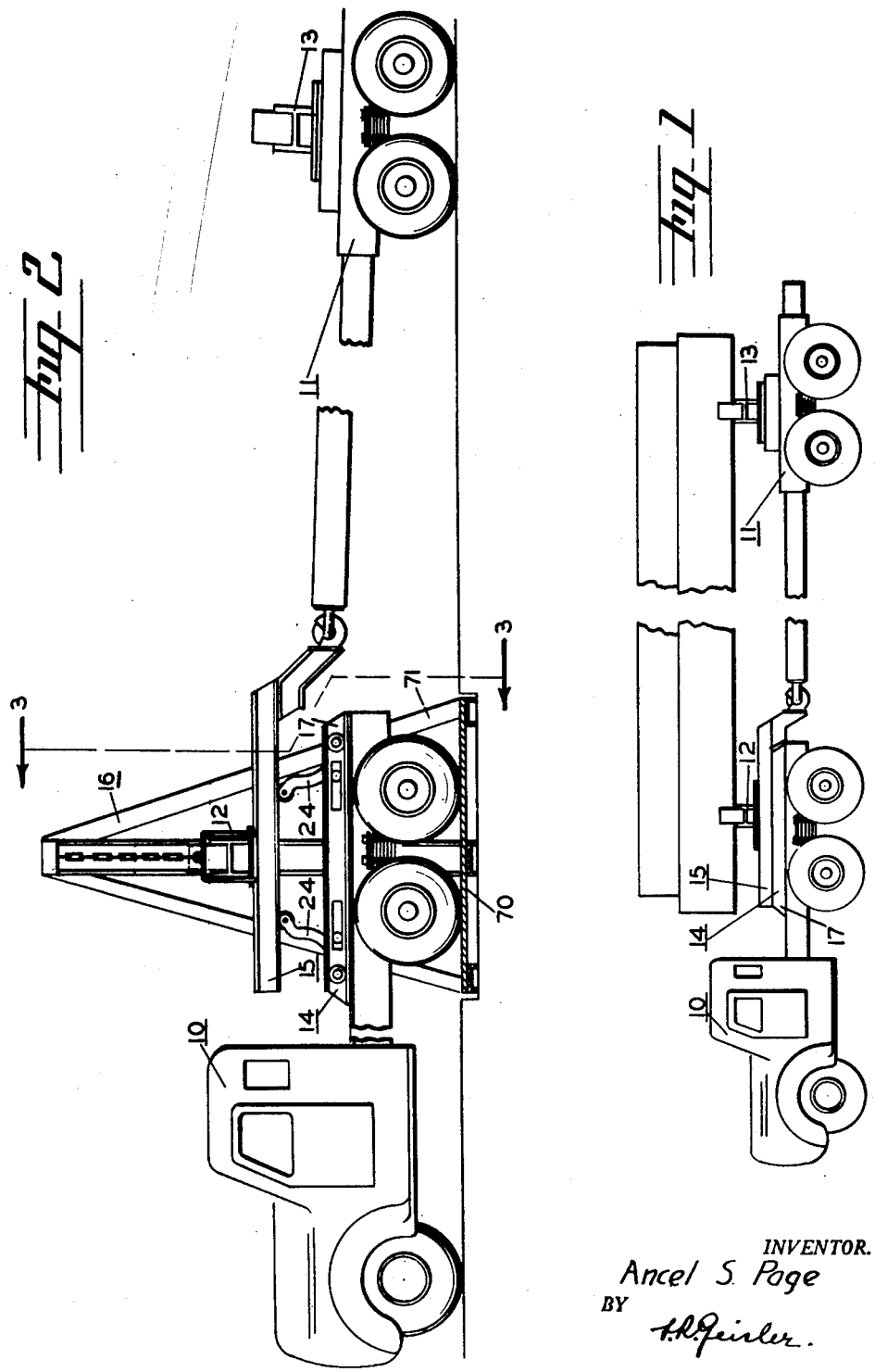
INVENTOR.
Ancel S. Page
BY
*F. R. Geisler.*
ATTORNEY

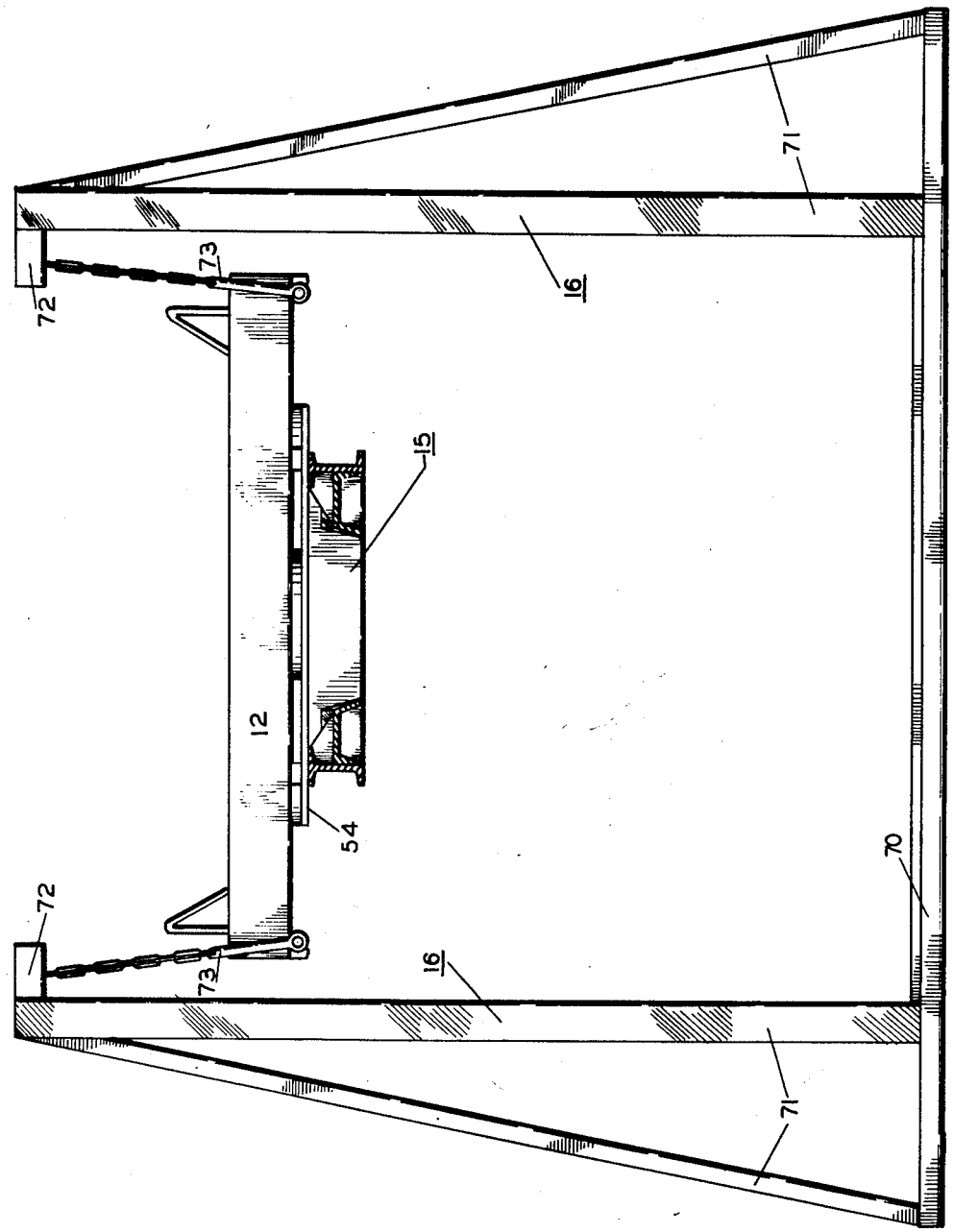

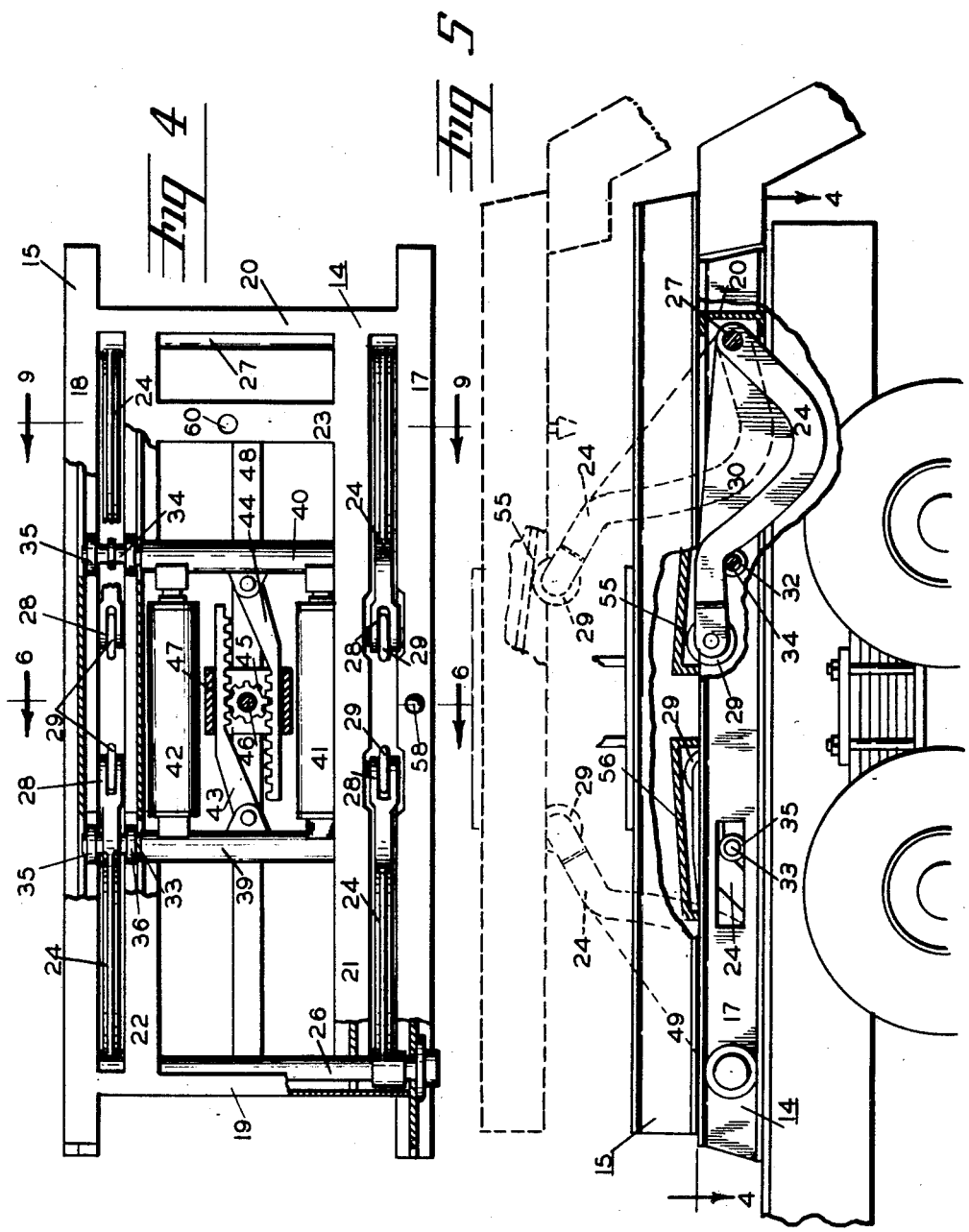

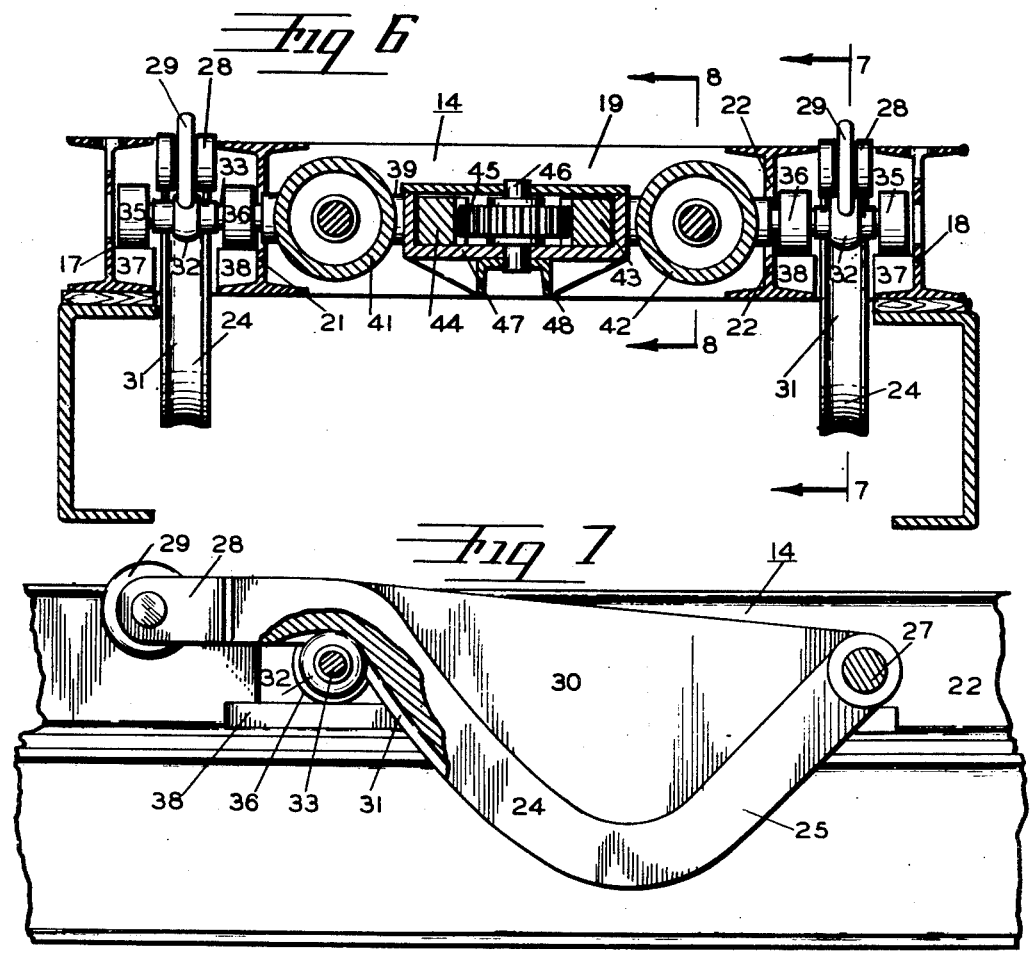

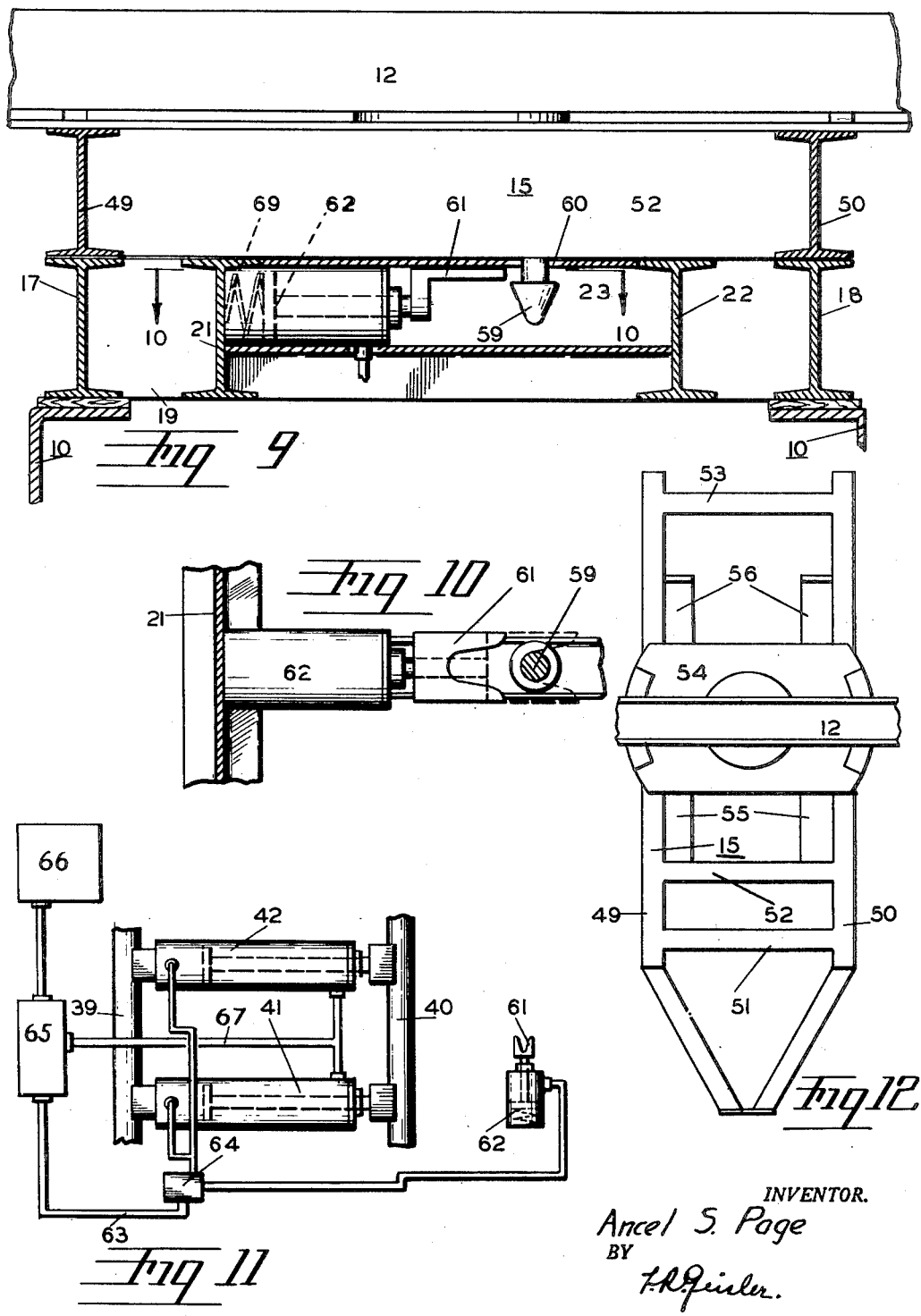

Patented Mar. 9, 1954

2,671,670

UNITED STATES PATENT OFFICE 2,671,670

REMOVABLE LOAD-CARRYING FRAME FOR TRUCKS

Ancel S. Page, Portland, Oreg.

Application January 16, 1951, Serial No. 206,196

3 Claims. (Cl. 280—143)

This invention relates to the loading and unloading of trucks and similar vehicles, and relates in particular to trucks of the type employed in the hauling of logs, pipes etc., including trucks used in conjunction with trailer vehicles in the hauling of such loads.

In the hauling of logs, for example, particularly in the case of long or heavy logs for the hauling of which a trailer is used with the truck, considerable time is required for the loading of the large logs on to the truck and trailer, and during the time required for such loading the truck and the driver of the truck remain idle. As a result, especially when the work is being performed on a large scale, with the employment of a number of trucks, the total loss of such time on the part of trucks and drivers represents a considerable cost. Also in the hauling of logs it is often necessary to transfer the load from one truck to another, as for example, when a heavy, over-size truck is used on a private unimproved or steep logging road for hauling the log load to the highway and the load is then transferred to a lighter truck meeting the requirements of public highway regulations for continuing the hauling of the load along the improved highway to the mill.

One object of the present invention is to eliminate loss of loading time by enabling the loading operation to be performed largely in advance of the arrival of the truck and driver on the scene.

Another object of the invention is to enable loads, particularly log loads, to be transferred from one hauling vehicle to another. The transferring of loads from one hauling vehicle to another, thus from a special tractor or heavy truck to a lighter truck for highway travel, has the further advantage of enabling logging to be carried on for longer periods during the year.

More specifically, the object of this invention is to provide an attachment or load-carrying frame and trailer combination for a truck on which the customary loading may take place, and which load-carrying frame, with the loading operation completed, can then be set in position on the truck with a minimum expenditure of time and labor, and can be transferred from one truck to another.

A related specific object of this invention is to provide an improved load-carrying frame for logging trucks and the like which can easily be removed from, and easily remounted on the truck.

An additional object of the invention is to provide such a removable loading frame or load-carrying frame which can be lifted from, or lowered on to, the normal position on the truck chassis by means operable by the driver of the truck.

A still further object is to provide a removable load-carrying frame of the type above indicated which will be simple and practical in construction and suitable for installation on any logging truck or similar vehicle.

The manner in which my improved load-carrying frame is constructed, the manner in which it is operated, and the means employed in conjunction with the same, whereby the objects of the invention are attained, are hereinafter described with reference to the accompanying drawings.

In the drawings:

Fig. 1 is a side elevation of a logging truck embodying my invention, the truck being shown also with the customary trailer attached thereto and with a log load on the truck and trailer;

Fig. 2 is a side elevation of the same truck and trailer without the log load and showing the load-carrying frame of the truck in raised position on the truck, and also showing the truck stationed in a stanchion preparatory to the leaving of the load-carrying frame supported in the stanchion, the near side of the stanchion removed for the sake of clarity;

Fig. 3 is an elevation of the stanchion taken at right angles to Fig. 2 and drawn to a larger scale, and also showing the load-carrying frame of the truck removed from the truck and entirely supported in the stanchion after the departure of the truck from the location, the load-carrying frame being shown in section taken on line 3—3 of Fig. 2;

Fig. 4 is a top plan view of the sub-frame or truck chassis with the superimposed or load-carrying frame removed therefrom, the view corresponding to line 4—4 Fig. 5;

Fig. 5 is a side elevation of the truck with the load-carrying frame in normal position on the truck and with the raised position of the load-carrying frame on the truck indicated by broken lines;

Fig. 6 is a transverse vertical section on line 6—6 of Fig. 4 but drawn to a larger scale;

Fig. 7 is a fragmentary elevation of one of the lifting arms by means of which the load-carrying frame is lifted to raised position on the truck, the view being taken on line 7—7 of Fig. 6;

Fig. 8 is an enlarged elevation of one of the pair of hydraulic cylinders operating the lifting arms, the view being taken on line 8—8 of Fig. 6;

Fig. 9 is a transverse section on line 9—9 of Fig. 4 but drawn to a larger scale;

Fig. 10 is a fragmentary plan section on line 10—10 of Fig. 9;

Fig. 11 is a fragmentary, more or less diagrammatic, plan section showing the two frame-lifting hydraulic cylinders together with the hydraulic locking control in their connected relationship and;

Fig. 12 is a top plan view of the load-carrying frame by itself.

Referring first to Figs. 1 and 2, the truck shown, which is indicated in general by the reference character 10, is to be understood as representing any of the well known types of trucks employed particularly for the hauling of logs, long pipes, etc., and is also shown with a customary trailer vehicle 11 connected with the truck. The customary load-supporting bunks 12 and 13 are also shown mounted on the truck and trailer respectively, and on these bunks the forward and rear ends of the logs or pipes are supported.

In my invention, instead of having the customary single integral frame for the truck on which the truck bunk is mounted, I provide a main sub-frame or truck chassis portion 14, and a second, superimposed frame 15, normally mounted on and secured to the main sub-frame 14, but capable of being raised above the main frame and then entirely separated from the main frame. This upper or superimposed frame I designate as the load-carrying frame.

In Fig. 1 the load-carrying frame 15 is shown in normal lowered position on the truck. In Fig. 2 this load-carrying frame 15 is shown in lifted position with respect to the truck, and furthermore the truck 10 is shown stationed in a stanchion which is indicated in general by the reference character 16 and which will be described later. In the stanchion 16 the load-carrying frame 15 may be held supported independently of the truck, as illustrated in Fig. 3. In the carrying out of my invention the loading can be done on the load-carrying frame and on the trailer either while the load-carrying frame is held supported in the stanchion 16, or when the load-carrying frame is mounted on a truck with the trailer connected. If the loading takes place while the frame is supported in the stanchion the truck can meanwhile be otherwise employed if desired.

The construction of the main frame, or subframe, of the truck, on which the upper or loadcarrying frame is mounted, and the means by which the upper or load-carrying frame is lifted from, or lowered on to, the body of the truck, will be described with reference to Figs. 4 to 8 inclusive.

The main frame or sub-frame includes a pair of longitudinally-extending I-beams 17 and 18 at the sides of the truck respectively, transverse frame members 19 and 20 at each end, inner longitudinal members or I-beams 21 and 22, and an inner transverse member 23, all welded together to form an integral frame as shown in Fig. 4. A pair of oppositely positioned hinged arms 24 are located at each side of the frame and are hinged for up and down movement on the transverse shafts 26 and 27 as shown, the said transverse shafts 26 and 27 extending through and being supported by the longitudinal beams 17 and 18 and inner longitudinal members 21 and 22.

The shape of each of the four arms 24 is shown in Figs. 5 and 7. Each arm has a main downwardly-bowed portion 25 (Fig. 7) followed by a straight portion 28, the end of which is bifurcated and in which a roller 29 is mounted. A web 30 extends across the bowed portion of the arm to reinforce the same. The underside of each arm 24 is formed with a concave groove 31 (Fig. 6) so as to form a track for a roller 32 (Fig. 7). The rollers 32 are mounted near the ends of a pair of movable, transversely-extending shafts 33 and 34 (Fig. 4). These movable shafts 33 and 34 in turn are supported at each end on a pair of spaced rollers 35 and 36 and these supporting rollers roll on shaft, horizontal, longitudinally-extending tracks 37 and 28 respectively (Figs. 6 and 7) which tracks are secured to the longitudinal frame members or I-beams 17 and 18 and 21 and 22, as shown in Fig. 6.

The movable shafts 33 and 34 extend through tubular inner housing 39 and 40 (Fig. 4) respectively. The tubular housing 39 is joined to the ends of a pair of identical hydraulic cylinders 41 and 42 as shown in Fig. 4. The other tubular housing 40 is connected to the outer ends of the hydraulic pistons which extend from the opposite ends of the hydraulic cylinders 41 and 42. The tubular housings 39 and 40 are also connected respectively with a pair of rack bars 43 and 44 which rack bars engage a common pinion 45. The pinion 45 is mounted on a vertical stub shaft 46 (Fig. 6) secured in the top and bottom walls of a housing 47. The housing 47 is supported by a central, longitudinal channel member 48 (Figs. 4 and 6). The housing 47 is open at each end and the rack bars 43 and 44 move within the pinion housing 47 and slidably engage the side walls of the housing, which side walls in turn hold the rack bars in engagement with their common pinion 45.

It will now be apparent from Figs. 4 and 5 that when the hydraulic pistons of the hydraulic cylinders 41 and 42 move outwardly in unison the tubular housings 39 and 40, and with them the shafts 33 and 34, will move simultaneously in opposite directions away from each other. Similarly, when the hydraulic pistons are caused to move inwardly in their cylinders the movable shafts 33 and 34 will move simultaneously towards each other. Due to the connection of the tubular housings with their rack bars and common pinion 45, the extent of movement of the two movable shafts 33 and 34 under normal conditions will always be substantially the same. Other means for equalizing the extent of movement of the tubular housings 39 and 40 or the shafts 33 and 34 might also be employed.

The upper or load-carrying frame 15 (Figs. 2, 3, 5, 9, and 12) includes a pair of longitudinally-extending I-beams 49 and 50 and transverse members 51, 52 and 53 (Fig. 12) formed into a rigid integral frame. A mounting plate 54 for the load-supporting bunk 12 is secured on the top of the frame and bunk 12 is mounted thereon with the customary central pivotal mounting and rub plates out at the sides. A pair of longitudinally-extending inclined tracks 55 and 56 are secured to the inside face of each of the frame members 49 and 50 (Figs. 5 and 12). As shown in Fig. 5, these inclined tracks 55 and 56 have a slight upward slope from the outer ends to their inner ends, and their inner ends are spaced a slight distance apart from each other. As will be understood from Fig. 5, these two pairs of tracks 55 and 56 are adapted to be engaged by the two pairs of rollers 29 on the arms 24 whenever the upper or load-carrying frame 15 is to be lifted from, or lowered on to, the main or sub-frame 14.

When the upper or load-carrying frame 15 is to be raised on the truck from the full line position shown in Fig. 5 to the raised broken line indicated in that figure, hydraulic fluid is caused to pass into the hydraulic cylinders 41 and 42 (Fig. 4), so as to move the pistons outwardly. This causes the tubular housings 39 and 40 to move in opposite directions away from each other, as previously described, and thus causes the pair of rollers 32 at each side to move in opposite directions. Since these rollers 32 engage the arms 24, this movement of the rollers 32 causes the arms 24 at both sides to be raised to the broken line position indicated in Fig. 5. The rollers 29 on the ends of the arms 24, bearing against the tracks 55 and 56 at each side of the upper or load-carrying frame 15 cause this frame to be lifted to the raised position. Similarly causing or permitting the hydraulic pistons to move in the opposite direction in the hydraulic cylinders 41 and 42 will cause the arms 24 to be lowered to their normal resting position in the main or sub-frame 14.

In order to keep the upper or load-carrying frame 15 from sliding out of place when it is in its normal lowered position on the main frame 14 of the truck, I provide a plurality of pointed lugs or pins, preferably at least one on each side, extending upwardly from the main frame 14 and adapted to engage holes or sockets in the underside of the load-carrying frame 15. One such engaging pin 58 extending up from the main frame 14 is shown in Fig. 4. Also in order to lock the load-carrying frame 15 to the main or sub-frame 14 and thus to prevent any inadvertent lifting of the load-carrying frame from the main frame or any bouncing of the load-carrying frame on the main frame, in the event the truck travels over very rough ground, I prefer to provide a hydraulically controlled latching means which is illustrated in Figs. 9 and 10, although other mechanical means could be used for this same purpose.

A latching lug 59 (Fig. 9) having a reduced neck and an enlarged conically-shaped head portion, is secured to the underside of the cross member 52 of the load-carrying frame and is adapted to pass down through an opening 60 (Figs. 4 and 9) in the top of the cross member 23 of the main or sub-frame. A sliding latch member 61, formed with a diverging central slot as shown in Fig. 10, is adapted to slide over the neck of the latching lug 59 and thus lock the enlarged head of the latching lug against upward movement. The sliding latch member 61 is secured on the outer end of a hydraulic and spring-actuated piston which is mounted in a hydraulic cylinder 62, the cylinder 62 in turn being secured in the main or sub-frame as shown in Fig. 9.

The hydraulic cylinder 62 for the locking latch 61, and the two hydraulic cylinders 41 and 42 for operating the arms 24 of the main or sub-frame, are connected to a hydraulic pump indicated at 65 in Fig. 11, located in the truck, which pump is supplied with hydraulic fluid from a suitable supply tank 66. The operation of the pump is controlled by suitable means (not shown) conveniently positioned so as to be operated by the driver of the truck from the truck cab. The hydraulic cylinders 41 and 42 and hydraulic cylinder 62 are connected up in the manner illustrated in Fig. 11. A pipe 63 from the oil pump connects with one end of the cylinders 41 and 42 and with the cylinder 62 through the actuating valve 64. Thus the passage of hydraulic fluid from the pump through the pipe 63 and thence into the cylinders will cause the piston in cylinder 62 to move inwardly against the force of its spring, when the hydraulic pressure reaches a predetermined minimum amount, and cause the latch 61 to be withdrawn to unlocked position and will then cause the double acting pistons in the cylinders 41 and 42 to move outwardly and lift the load-carrying frame as previously explained. Thus the pistons will not start to move outwardly in the cylinders 41 and 42 until the piston to which the latch 61 is attached, is moved inwardly in hydraulic cylinder 62. In other words, the hydraulic cylinders 41 and 42 with their pistons will not operate to raise the arms 24 and thus lift the load-carrying frame until the latch 61 has been withdrawn.

Reverse flow of the hydraulic fluid from the pump 65, thus the delivery of hydraulic fluid from the pump through the pipe 67 to the cylinders 41 and 42 will cause the hydraulic pistons in those cylinders to move in the opposite direction and thus lower the load-carrying frame into normal position on the truck. When the load-carrying frame 15 is being lowered into normal position on the truck the conically-shaped head portion of the lug 59 passes down through the opening 60 and engages the latch member 61 pushing the latch member and its supporting piston against the force of the spring 69 until the conical head passes below the latch member 61 and the latter moves back under the force of the spring into locking position.

The stanchion 16 in which the load-carrying frame 15 may be supported during the loading of the load-carrying frame and trailer in the absence of the truck, is shown in Figs. 2 and 3, and consists of a base 70 and suitable upright braces 71 at each side, as illustrated. A block 72 is mounted at the top of the uprights and braces at each side and provides an anchorage for chain hangers 73. These chain hangers 73 are adapted to be slipped over the ends of the bunk 12 of the load-carrying frame 15 when the load-carrying frame is raised on the truck and properly positioned with respect to the stanchion. Various modifications could of course be made in the construction of the stanchion itself.

The unloaded truck, with my load-carrying frame 15 secured in normal position on the main or sub-frame 14, and with the trailer vehicle attached to the load-carrying frame, is driven to the stanchion until the bunk 12 of the load-carrying frame is substantially in alignment with the chain hangers 73 of the stanchion. The driver of the truck, without leaving the truck cab, causes the hydraulic pump to be operated and sets the controls, whereupon the latch 61 is first withdrawn, unlocking the load-carrying frame 15 from the truck, and the two pairs of arms 24 act to lift the load-carrying frame to the raised position illustrated in Fig. 2. The chain hangers 73 are then placed over the ends of the bunk 12 and the hydraulic controls are operated to cause the arms 24 to drop down to normal position leaving the load-carrying frame 15 supported entirely by the stanchion. The truck is then free to be driven away and to be used for other hauling while the load-carrying frame 15 and trailer 11 are being loaded. When the loading is completed a truck backs in under the load-carrying frame and the arms 24 are raised until they engage the load-carrying frame. Then the chain hangers 73 of the stanchion are disconnected and the load-carrying frame with its load is lowered on to the truck and secured in normal position. Thereupon the loaded truck and trailer can immediately be driven away. Thus there is no loss of time by the truck or driver and, particularly when large scale logging operations, for example, are being carried on, a most efficient use of trucks is possible and a larger number of stanchions, load-carrying frames and trailers than trucks can be efficiently utilized.

Similarly my device may be employed in transferring a load from one truck to another. For example, a special truck or tractor may be used for hauling the load from the woods to the highway and the load there transferred to a lighter truck or a truck more suitable for pulling the trailer and carrying the load for a long distance haul on the highway.

I claim:

1. In a truck and trailer assembly of the character described, a truck body frame, a demountable load-carrying frame normally secured on said truck body frame, two pairs of arm assemblies hinged to said truck body frame for up and down movement in substantially vertical planes, rollers mounted on the free ends of said arm assemblies, said rollers adapted to bear against the underside of said demountable frame, tracks for said rollers on the underside of said demountable frame, means on said truck body frame for raising and lowering said arm assemblies in unison, whereby to raise or lower said demountable frame on said truck body frame while maintaining said demountable frame substantially parallel to said truck frame, and means for locking said demountable frame to said truck body frame when said demountable frame is in lowered position on said truck.

2. In a truck and trailer assembly of the character described, a truck body frame, a demountable load-carrying frame, normally secured on said truck body frame, a load-carrying bunk pivotally mounted on said demountable frame, two pairs of similar arm assemblies hinged to said truck body frame for up and down movement in substantially vertical planes, rollers mounted on the free ends of said arm assemblies, said rollers adapted to bear against the underside of said demountable frame, two pairs of similar tracks for said rollers on the underside of said demountable frame, the bottom face of each of said arm assemblies having a downwardly-bowed portion, movable members supported on said truck body frame engaging the bottom faces of said arm assemblies respectively, hydraulically - operated means on said truck body frame for moving said members for said pairs of arm assemblies in opposite directions in unison, whereby to raise or lower said demountable frame on said truck body frame while maintaining said demountable frame in desired registration with and substantially parallel to said truck frame, and means for locking said demountable frame to said truck body frame when said demountable frame is in lowered position on said truck.

3. In a truck and trailer assembly of the character described, a truck body frame, a demountable load-carrying frame normally secured on said truck body frame, a load-carrying bunk pivotally mounted on said demountable frame, a trailer vehicle connected to the rear end of said demountable frame by a substantially universal joint connection, two pairs of similar but oppositely arranged arms hinged to said truck body frame for up and down movement in substantially vertical planes, rollers mounted on the free ends of said arms, said rollers adapted to bear against the underside of said demountable frame, two pairs of similar but oppositely arranged tracks for said rollers on the underside of said demountable frame, a groove extending along the bottom face of each of said arms, rotatable and movable members supported on said truck body frame engaging said grooves respectively, hydraulically-operated means on said truck body frame for moving said members for said pairs of arms in opposite directions in unison, whereby to raise or lower said demountable frame on said truck body frame while maintaining said demountable frame in desired registration with and substantially parallel to said truck body frame, and means for locking said demountable frame to said truck body frame when said demountable frame is in lowered position on said truck and for automatically unlocking said locking means when said demountable frame is being raised on said truck.

ANCEL S. PAGE.

References Cited in the file of this patent

UNITED STATES PATENTS

| Number | Name | Date |
|---|---|---|
| 1,424,788 | Westlake et al. | Aug. 8, 1922 |
| 1,588,036 | Laurence | June 8, 1926 |
| 1,595,880 | Schmid | Aug. 10, 1926 |
| 1,663,140 | Remde | Mar. 20, 1928 |
| 1,862,574 | Kuhlman | June 14, 1932 |
| 1,894,950 | Fitch | Jan. 24, 1933 |
| 1,908,987 | Kuhlman | May 16, 1933 |
| 2,151,385 | Jacobson | Mar. 21, 1939 |
| 2,251,839 | Dondlinger | Aug. 5, 1941 |
| 2,407,447 | Pollard | Sept. 10, 1946 |
| 2,560,769 | Knudsen | July 17, 1951 |